United States Patent [19]

Hira et al.

[11] 4,323,276
[45] Apr. 6, 1982

[54] VEHICLE ROOF STRUCTURE

[75] Inventors: Kazumi Hira, Fijisawa; Masao Tasho, Kamakura, both of Japan

[73] Assignee: Nissan Motor Company, Limited, Kanagawa, Japan

[21] Appl. No.: 177,827

[22] Filed: Aug. 13, 1980

[30] Foreign Application Priority Data

Aug. 17, 1979 [JP] Japan .................. 54-113697[U]

[51] Int. Cl.³ .................................. B62D 25/06
[52] U.S. Cl. .................................... 296/214
[58] Field of Search ........................ 296/214

[56] References Cited

U.S. PATENT DOCUMENTS

| | | | |
|---|---|---|---|
| 2,194,902 | 3/1940 | Heuer | 296/214 |
| 2,239,318 | 4/1941 | Haberstump | 296/214 |
| 3,524,675 | 8/1970 | Wolf | 296/214 |
| 4,275,919 | 6/1981 | Okamoto | 296/214 |

Primary Examiner—Joseph F. Peters, Jr.
Assistant Examiner—John A. Carroll

[57] ABSTRACT

An improved vehicle roof structure forming part of a vehicle body of a passenger car or the like, comprising a plurality of listing wires each having at least one end portion anchored by means of an anchor to one of spaced, parallel marginal portions of a roof panel. The anchor includes a bored portion formed with an axial bore which is open at one end of the bored portion and which has one end portion of the listing wire fitted thereinto, an abutment portion formed at the other end of the bored portion in abutting engagement with the marginal portion, a non-circular portion disposed adjacent to the abutment portion and having a non-circular cross section shaped substantially in conformity to and in mating engagement with the opening, and a projecting portion protruding from the non-circular portion.

8 Claims, 12 Drawing Figures

PRIOR ART

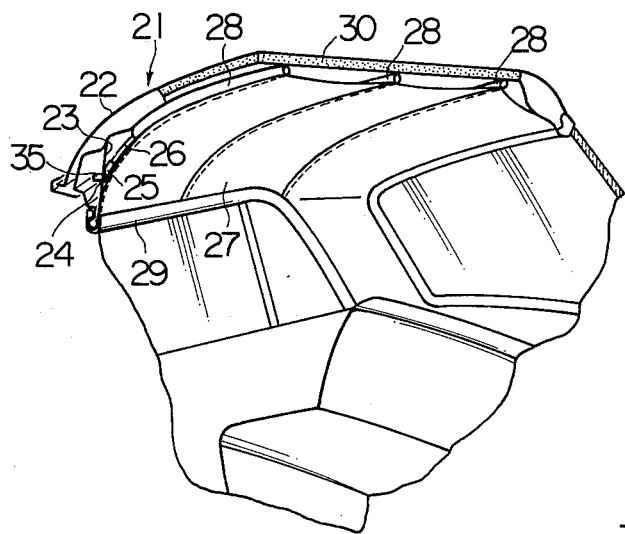
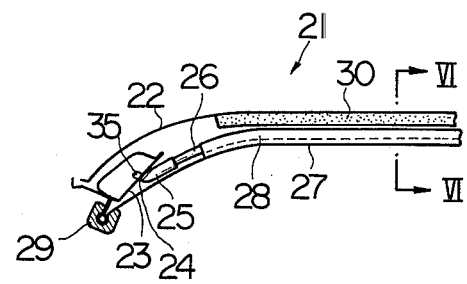
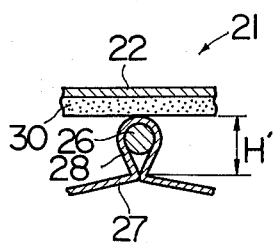
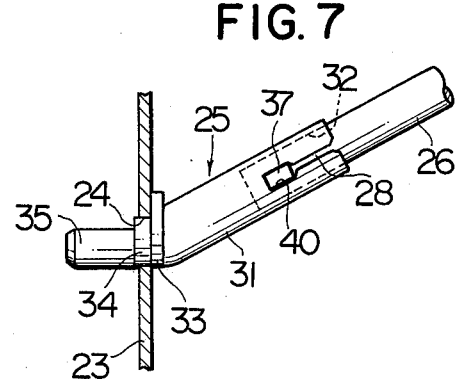
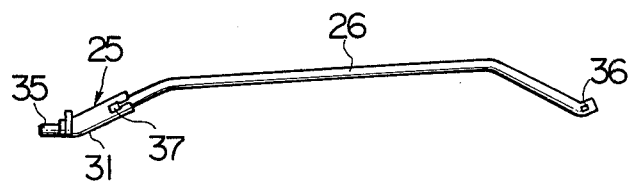

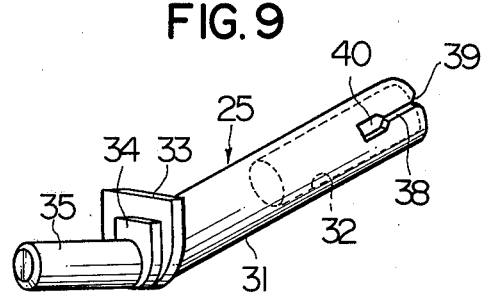
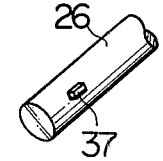
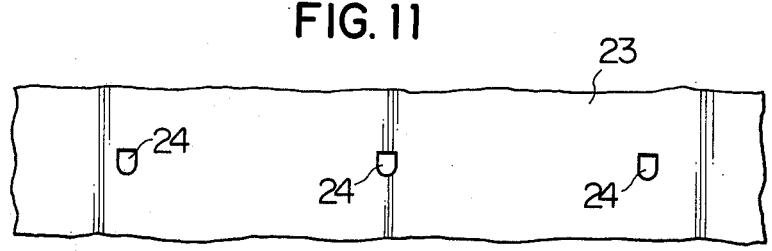
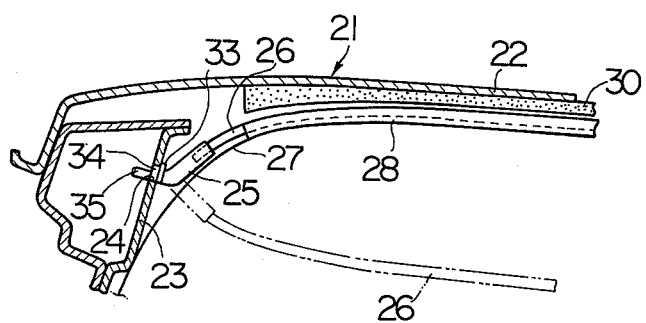

VEHICLE ROOF STRUCTURE

FIELD OF THE INVENTION

The present invention relates to a vehicle roof structure forming part of a vehicle body of a passenger car or the like, and more particular to an improved roof structure which comprises a plurality of listing wires each having at least one end portion anchored by means of an anchor to one of spaced, parallel marginal portions of a roof panel.

DESCRIPTION OF THE PRIOR ART

Conventionally, there have been proposed and known a wide variety of such roof structures one of which is shown in FIG. 1. The roof structure shown comprises a roof panel 1, a pair of spaced, parallel roof side rails 2 each of which is formed with a plurality of openings 3 disposed at spacings from each other in a direction substantially parallel with the roof side rails 2, a plurality of listing wires 4 spaced apart substantially in parallel from each other and anchored at their opposite end portions to the roof side rails 2, a head lining 5 formed with a plurality of sleeves 6 spaced apart substantially in parallel from each other and extending toward the roof panel 1 to receive the listing wires 4 so that the head lining 5 can be suspended by the listing wires 4 at a suitable tension, a plurality of welts 7 attached to the roof side rails 2 and retaining the peripheral edges of the head lining 5, and a heat insulator 8 lining the inner surface of the roof panel 1 for protecting a passenger compartment from being heated with sunlight. Each of the listing wires 4 is bow-shaped in conformity to the inside contour of the roof panel 1, terminating in opposite end portions which are bent horizontally. When the listing wires are to be fitted to the roof side rails 2, it is required that one end of each of the listing wires pass throughout the length of each of the sleeves 6. For this purpose, the sleeve 6 is required to be sized to have a sufficient height H for permitting the listing wire 4 to pass therethrough as shown in FIG. 3. This results in reduction of the space available of the passenger compartment by a space corresponding to a height h. In order to avoid this disadvantage, another vehicle roof structure is proposed which comprises a plurality of listing wires each having opposite end portions formed straight in the longitudinal direction thereof, and two sets of anchors matingly engaging the openings, respectively, of the roof side rails and allowing the opposite portions of the listing wires to be fitted thereinto. The latter roof structure, however, has such a disadvantage that the listing wires are apt to turn during tautening of the head lining. As a result, the head lining tends to become loosened, making it impossible to expect the tuatening effect with the latter roof structure.

STATEMENT OF THE OBJECTS OF THE INVENTION

It is therefore a primary object of the present invention to provide a vehicle roof structure which permits the listing wires to smoothly pass through the sleeves of the head lining for saving the time and labor in passing the listing wires throughout the sleeves.

It is another object of the present invention to provide a vehicle roof structure which prevents the listing wires from turning during tautening of the head lining.

It is a further object of the present invention to provide a vehicle roof structure which prevents the passenger compartment from being narrowed.

SUMMARY OF THE INVENTION

The above objects of the present invention is accomplished by a vehicle roof structure which comprises a roof panel having a pair of spaced, parallel marginal portions each formed with a plurality of openings which are disposed at spacings from each other in a direction substantially parallel with the marginal portions; at least one set of anchors arranged on one of the marginal portions; a plurality of listing wires spaced apart substantially in parallel from each other and anchored at their opposite end portions to the marginal portions with the anchors interposed between at least one end portions of the listing wires and one of the marginal portions of the roof panel; and a head lining suspended by the listing wires underneath the roof panel; each of the anchors including a bored portion formed with an axial bore which is open at one end of the bored portion and which has one end portion of each of the listing wires fitted thereinto, an abutment portion formed at the other end of the bored portion in abutting engagement with the marginal portion, a non-circular portion disposed adjacent to the abutment portion and having a non-circular cross section shaped substantially in conformity to and in mating engagement with the opening, and a projecting portion protruding from the non-circular portion.

BRIEF DESCRIPTION OF THE DRAWINGS

The features and advantages of the vehicle roof structure according to the present invention will more clearly be understood from the following detailed description taken in conjunction with the accompanying drawings, in which:

FIG. 4 is a fragmentary perspective view similar to FIG. 1 but showing a vehicle roof structure embodying the present invention;

FIG. 5 is an enlarged fragmentary cross sectional view similar to FIG. 2 but showing part of the vehicle roof structure illustrated in FIG. 4;

FIG. 6 is a fragmentary cross sectional view taken along lines VI—VI of FIG. 5;

FIG. 7 is an enlarged side view of an anchor forming part of the vehicle roof structure according to the present invention and partially showing a listing wire and a roof side rail which are also assembled into the vehicle roof structure according to the present invention;

FIG. 8 is a side view of the anchor assembled with the listing wire;

FIG. 9 is an enlarged perspective view of the anchor shown in FIG. 7;

FIG. 10 is a fragmentary perspective view showing one end portion of the listing wire;

FIG. 11 is a fragmentary elevational view of the roof side rail formed with openings each of which is to be in mating engagement with a non-circular portion of the anchor;

FIG. 12 is a fragmentary cross sectional view of the vehicle roof structure according to the present invention and shows another method of assembling the vehicle roof structure.

DESCRIPTION OF THE PREFERRED EMBODIMENT

Figure 1:
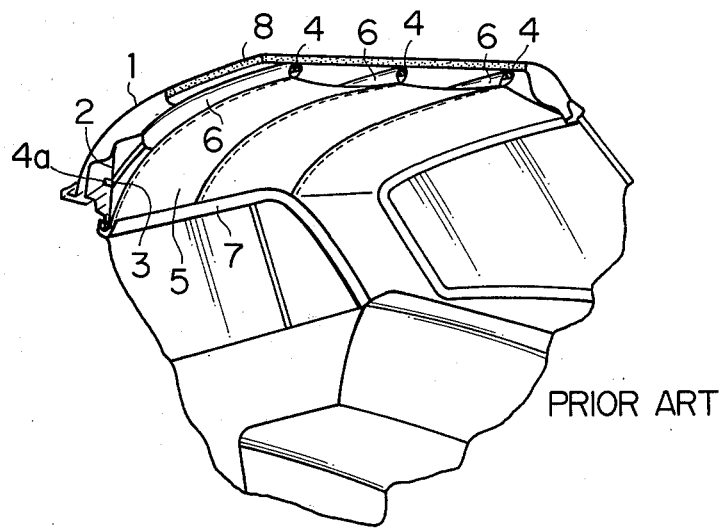
FIG. 1 is a fragmentary perspective view, partially cross sectioned, of the passenger compartment of an automobile having a conventional vehicle roof structure.
Figure 2:
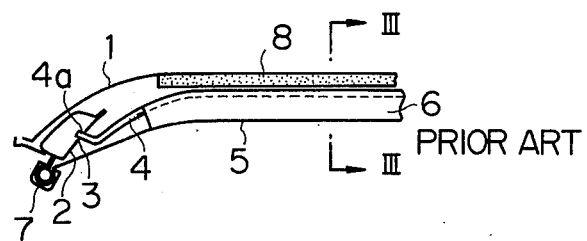
FIG. 2 is an enlarged fragmentary cross sectional view showing part of the vehicle roof structure illustrated in FIG. 1.
Figure 3:
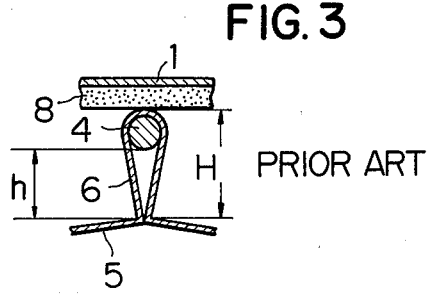
FIG. 3 is a fragmentary cross sectional view taken along lines III—III of FIG. 2.

Referring now to the drawings, and in particular to FIGS. 4 to 6, a vehicle roof structure embodying the present invention is generally indicated at 21. The vehicle roof structure 21 comprises a roof panel 22 which has a pair of roof side rails 23 each formed with a plurality of openings 24 which are disposed at suitable spacings from each other in a direction substantially parallel with the roof side rails 23. The vehicle roof structure 21 further comprises one set of anchors 25 to be arranged on one of the roof side rails 23, and a plurality of listing wires 26 spaced apart substantially in parallel from each other. A head lining 27 is formed with a plurality of sleeves 28 spaced apart substantially in parallel from each other. The sleeves 28 extend toward the roof panel 22 and receive the listing wires 26, respectively, so that the head lining 27 is suspended by the listing wires 26. As described in connection with the conventional vehicle roof structure shown in FIGS. 1 to 3, the peripheral edges of the head lining 27 are retained by welts 29 attached to the roof side rails 23, and a heat insulator 30 is provided to the inner surface of the roof panel 22 for protecting a passenger compartment from being heated with sunlight.

In FIGS. 7, 8 and 9, each of the anchors 25 is shown comprising a bored portion 31 formed with an axial bore 32 which is open at one end of the bored portion 31 and which has one end portion of each of the listing wires 26 fitted thereinto, an abutment portion 33 formed at the other end of the bores portion 31 in abutting engagement with the roof side rail 23. The anchor 25 further comprises a non-circular portion 34 disposed adjacent to and securely connected to the abutment portion 33 and having a tongue-shaped cross section which is substantially identical to a tongue-shaped cross section of the opening 24 (see FIG. 11) so that the non-circular portion 34 can be in mating engagement with the opening 24. A projecting portion 35 horizontally protrudes from the non-circular portion 34 into the inside of the roof side rail 23 and has a center axis angled with respect to the center axis of the bored portion 31. The listing wire 26 is generally bow-shaped and has formed at the other end portion thereof a key 36 radially projecting from the surface thereof so as to prevent the listing wire 26 from being rotated when the other end portion of the listing wire 26 is in mating engagement with the opening 24 of the roof side rail 23. Similarly, the listing wire 26 has formed at one end portion thereof another key 37 radially projecting from the surface thereof. The bored portion 31 of the anchor 25 is formed with an axial slot 38 having a dove-tailed end portion 39 and terminating in an enlarged portion 40 so that the key 37 can be forced through the axial slot 38 until the key 37 is received in the enlarged portion 40 when one end portion of the listing wire 26 is received in the axial bore 32 of the bored portion 31. It is desirable that the anchor 25 as a whole or at least the bored portion 31 thereof be made of an elastic material such as for example a plastic or hard rubber for facilitating forcing of the key 37 through the axial slot 38.

The procedures for assembling the listing wires into the vehicle roof structure will now be described hereinlater.

Firstly, the listing wire 26 which has one end formed straight in the longitudinal direction thereof is inserted throughout the sleeve 28 with the other end portion thereof bent or angled with respect to the longitudinally intermediate portion of the bow-shaped listing wire 26. The leading end portion of the listing wire 26 is then received in the axial bore 32 of the bored portion 31 with the key 37 forced through the axial slot 38 against the elasticity of the bored portion 31 until the key 37 is received in the enlarged portion 40. Thus, the key 37 is enabled to be captured in the enlarged portion 40 so that the listing wire 26 is precluded from rotating with respect to the anchor 25. The projecting portion 35 of the anchor 25 is then inserted to project into the inside of the roof side rail 23 until the non-circular portion 34 is brought into mating engagement with the opening 24 and the abutment portion 33 into abutting engagement with the roof side rail 23. This prevents the listing wire 26 and the anchor 25 from being turned with respect to the roof side rail 23. The other end portion of the listing wire 26 is thereafter inserted into the opening 24 of the associated roof side rail 23 with the key 36 anchored to the opening 24, thereby preventing the listing wire 26 from being rotated.

While the steps of assembling the listing wire 24 into the vehicle roof structure 21 have been described in the above, such steps are repeated for the assemblage of the remaining listing wires into the vehicle roof structure 21.

For assembling the listing wires into the vehicle roof structure, another method may be put to use in place of the above described procedures, as will be described hereinafter.

The listing wire 26 is passed through the sleeve 28, and is then fitted to the board portion 31 of the anchor 25 in manner similar to those previously described. As shown in FIG. 12, the projecting portion 35 of the anchor 25 is then inserted into the opening 24 of the roof side rail 23, and the other end portion of the listing wire 26 is inserted through the opening 24 in the other roof side rail 23. In this instance, the listing wire 26 may be temporarily held in a position having its intermediate portion bent away downwardly from the roof panel 22 as shown by phantom lines of FIG. 12. The listing wire 26 is then turned up 180 degrees to assume a raised final position shown by solid lines of FIG. 12, whereupon the noncircular portion 34 is brought into mating engagement with the opening 24 of the roof side rail 23 and the abutment portion 33 is brought into abutting engagement with the roof side rail 23. Simultaneously when this occurs, the key 36 of the listing wire 26 is snapped into the opening 24 in the associated roof side rail 23. Therefore, the listing wire 26 is stably maintained in bow form and tautly stretched the head lining 27 between the associated roof side rails 23, providing in an excellent internal appearance of the head lining 27. Once the head lining 27 is thus stretched by the listing wires 26, the peripheral edges of the head lining 27 are retained by the welts 29 so as to put an end to the tautening of the head lining 27.

While it has been described that only one set of anchors 25 are arranged on one of the roof side rails 23 with the anchors 23 interposed between one end portions of the listing wires 26 and the roof side rails 23, an additional set of anchors may be arranged on the other of the roof side rails 23 to be interposed between the other end portions of the listing wires 26 and the other of the roof side rails 23 in accordance with the present invention. While, furthermore, it has been assumed that the listing wires 26 are anchored to the roof side rails 23 of the roof structure 21, this is merely by way of example and, as such, the listing wires 26 may be directly anchored at their opposite end portions to any other marginal portions of the roof panel 22 if the marginal portions are spaced apart in parallel from each other. These marginal portions may be the front and rear roof rails of a roof structure.

While, moreover, it has been described that the key 37 and the axial slot 38 are associated to prevent rotation of the listing wire 26 with respect to the bored portion 31 of the anchor 25, the listing wire 26 may be splined or serrated to the bored portion 31 of the anchor 25, if desired. Any rotation preventive means may be employed in the present invention for this purpose. In addition, more than one combination of the key 37 and the axial slot 38 may be provided in lieu of only one combination of the key 37 and the axial slot 38 which has been described above and illustrated in FIGS. 7 to 9.

According to the present invention, the listing wire can smoothly be passed throughout the sleeve of the head lining since one end portion of the listing wire is formed straight without being bent if the cross sectional area of the sleeve 28 is somewhat larger than that of the listing wire 26. Therefore, the height H' of the sleeve 28 can be extremely lessened as compared with the height H of the sleeve 6 of the head lining 5 of a conventional vehicle roof structure as will be understood upon comparison between FIGS. 3 and 6. Such a lessened height of the sleeve 28 enables the passenger compartment to becomes more spacious than the conventional passenger compartment. Also, the smooth passing of the listing wire will save the time and labor in passing the listing wires throughout the sleeves. In addition, due to the provision of the abutment portion of the anchor, the listing wire is enabled to stably maintain a bow-shaped configuration, providing in an excellent internal appearance of the head lining.

Although the particular embodiment of the present invention has been described and shown, it will be obvious to those skilled in the art that various changes and modifications may be made without departing from the spirit and scope of the present invention.

What is claimed is:

1. A vehicle roof structure comprising:
a roof panel having a pair of spaced, parallel marginal portions each formed with a plurality of openings which are disposed at spacings from each other in a direction subustantially parallel with said marginal portions;
at least one set of anchors arranged on one of said marginal portions;
a plurality of listing wires spaced apart substantially in parallel from each other and anchored at their opposite end portions to said marginal portions with said anchors interposed between at least one end portions of said listing wires and one of said marginal portions of said roof panel; and
a head lining suspended by said listing wires underneath said roof panel;
each of said anchors including a bored portion formed with an axial bore which is open at one end of the bored portion and which has one end portion of each of said listing wires fitted thereinto, an abutment portion formed at the other end of said bored portion in abutting engagement with said marginal portion, a non-circular portion disposed adjacent to said abutment portion and having a non-circular cross section shaped substantially in conformity to and in mating engagement with said opening, and a projecting portion protruding from said non-circular portion.

2. A vehicle roof structure as defined in claim 1, wherein each of said anchor further includes means for preventing each of said listing wires from being rotated with respect to the anchor.

3. A vehicle roof structure as defined in claim 1, wherein each of said listing wires has formed at one end portion thereof at least one key radially projecting from the surface thereof; and wherein said bored portion of each of said anchors is formed with an axial slot having a dove-tailed end portion and terminating in an enlarged portion so that said key can be forced through said axial slot until said key is received in said enlarged portion when said one end portion of each of said listing wires is received in said axial bore of said bored portion.

4. A vehicle roof structure as defined in claim 1, wherein said non-circular portion of each of said anchors has a tongue-shaped cross section and each of said openings has a tongue-shaped cross section substantially identical to that of said non-circular portion so that said non-circular portion can be in mating engagement with said opening.

5. A vehicle roof structure as defined in claim 1, wherein said projecting portion of each of said anchors has a center axis which is angled with respect to the center axis of said bored portion.

6. A vehicle roof structure as defined in claim 1, wherein said bored portion of said anchor is constructed of an elastic material.

7. A vehicle roof structure as defined in claim 1, which further comprises an additional set of anchors arranged on th other of said marginal portions to be interposed between the other end portions of said listing wires and the other of said marginal portions of said roof panel.

8. A vehicle roof structure as defined in claim 1, wherein each of said marginal portions is constituted by a roof side rail.

* * * * *